United States Patent Office 3,455,703
Patented July 15, 1969

3,455,703
METHOD OF PREPARING ANIMAL SKIN TO CONSTITUTE A BINDER IN FOOD PRODUCTS
Robert A. Keeley, Modesto, Calif., assignor to Norbest Turkey Growers Association, Salt Lake City, Utah, a corporation of Utah
No Drawing. Filed Apr. 27, 1966, Ser. No. 545,572
Int. Cl. A22b *11/00*
U.S. Cl. 99—208      4 Claims

ABSTRACT OF THE DISCLOSURE

The present invention consists in processing an animal skin, such as a turkey skin, by dehydrating said skin to remove the water therefrom and by use of a solvent to accomplish fat removal, such that the skin, when milled, may be employed as a food product binder.

---

The present invention relates to binders for food products such as meats and, more particularly, to a new binder ingredient taking the form of uniquely processed and milled, animal skin products. (The term "animal" as used herein denotes quadruped, fish, and fowl.)

Increasing in popularity each year are boned and rolled food products such as roller roasts, hams, turkey rolls, and so forth. Even experiments with egg rolls have been made. (The term "rolled" as used herein denotes food products, comprising a multiplicity of food segments, which are either actually "rolled" or otherwise preformed into a desired shape.)

The reasons for the wide appeal of rolled food products are customer convenience, slicing ease, ease of packaging, minimization of waste, and a maximizing of usability of small food pieces.

A basic problem presented in rolled food products is that of providing a measure of adherence as between adjacent pieces of a given food within a given roll. Heretofore, binder strings have been used to secure meats and fowl, for example, into a roll form. However, this has been quite unsatisfactory since the meat will tend to crumble away or otherwise lose its cohesiveness during slicing, the binder twine is undesirable from an appearance point of view, and in many cases the meat tends to fall apart.

Another approach made in the case of hams is to add gelatin to the roll prior to precooking. This has proven very unsatisfactory since all the gelatin oozes to the outer surface of the ham or other food roll, the taste is somewhat altered, and the food product itself is somewhat less savory—owing to the gelatinous substance necessarily accompanying the meat.

Some experimentation has been made with one or more of the phosphates as a binder, also with various fats as additives. These also have proven somewhat unsatisfactory by virtue of reducing the savory nature of the food product to which these are applied. Also, there seems to be a very reduced effect in desired cohesiveness of the food elements in a given roll.

Accordingly, it is a principal object of the present invention to provide a new type of binder ingredient for food which will supply cohesiveness to the constituents of any one of a number of food products.

It is a further object of the present invention to provide as a binder for foods such as meat and fowl rolls, a uniquely processed and milled skin product, and this in such a manner that the ultimate roll form retains its savory characteristics without increasing fat content, decreasing shelf life, or presenting other undesired properties in the final food product.

A further object is to provide a greatly needed use for skin products which otherwise would simply be waste material.

An additional object is to provide as a binder for foods such as meat and fowl rolls, egg rolls, and so forth, a unique, processed product having as its principal constituent a uniquely processed skin product.

A further object is to provide as a binder for foods a uniquely processed and milled, turkey-skin product, this for insuring that there is maximum cohesiveness among a multiplicity of food elements present in a given food roll.

The features of the present invention, together with further objects and advantages herein, may best be understood by reference to the following full description of the present invention.

The present invention, firstly, consists in a provision of a basic binder material. This the inventor selects as an animal (i.e., quadruped, fish, or fowl) skin, preferably turkey skin. The reason for the selection of skins in general is to insure the provision of a high-protein, cellular structure suitably constituted to insure maximum cohesion between food products of a given food roll. The high-protein content of the skins of fowl in general, and the low fat content of turkey skins in particular, render skins highly usable as a prospective binder material for food rolls. Turkey growers and packers, for example, have a unique problem in properly utilizing the great amount of turkey skins which accumulates after each day of packing activities. Formerly, this turkey skin has been simply a waste product. The inventor has found the skin to be highly usable as a meat binder when properly processed as hereinafter pointed out. The turkey skin is particularly usable because of its cellular structure and its high protein and low fat content. Of course, other types of skins might be used, howbeit somewhat less satisfactorily.

Once the selected skins (such as turkey skins) are obtained, then these skins must be suitably processed. The first step in the subject process is that of removing all water from the skins to preclude deleterious effects thereof with the solvent means to be subsequently added. The most ideal method of so treating the skins is to subject the skins to freeze-dehydration. Evacuation dehydration, with or without a slight elevation in ambient temperature, might also be used. By far the most effective, however, is the freeze-dehydration technique which in other arts has been commercially established practice.

Once the skins are dehydrated, then the next step is to remove all fatty oils therefrom. The reason for fat removal is to obviate the problem of fat oxidation. When a meat or poultry product is later subjected to a precooking step, physical and chemical changes in the fat occur and rancidity develops, with the attendant result of reduction in shelf life, the deterious effects on color and flavor, and so forth. Hence, it is desirous to remove substantially all fat from the skins before they are further treated. (Incidentally, it is for this reason that freeze-dehydration is preferred as an initial process step over dehydration techniques involving the application of heat.) Once the skins are freed of water, then they may be introduced into what is known in the art as a Solvex extraction process. In such a process the skins will generally be introduced into some type of centrifuge operated at a slightly increased temperature (100° F.) and reduced pressure (e.g., one-half atmosphere) so that, with the introduction of one or more suitable solvents such as hexane into the centrifuge to mix intimately with the skins, the fats and oils will be carried off from the skins into the solvent solution. Subsequently, the solvent and extracted oils and fats are carried away by centrifugal action and the skins left substantially free of the fatty products.

Solvex extraction, as above pointed out, has been used heretofore for the extraction of soy bean oils, cottonseed oils, and so forth. In the present invention it is deemed a highly useful step in treating the skins in order that the latter may be directly usable as a binder for food products such as meat and fowl rolls.

The next step consists in the drying of the skins in an autoclave or other similar environment so as to eliminate any toxic traces of solvent in the skins. The autoclave treatment, at an increased temperature, drives off any remaining solvent from the skins so as to leave the same completely non-toxic after treatment.

The next step in the process is to introduce the now dried and brittle skins into a mill for grinding. Any conventional industrial flour mill will serve this purpose. The skins will be milled to the consistency of flour.

After this step the resultant milled skins are ready, as a powdered substance, for introduction onto the meat or fowl products to be rolled.

From this point on, the binder may be either mixed directly with the food products in a conventional mixer, or the binder may be sprinkled onto meat, fowl, or other food products coming along a conveyor belt, this prior to a subsequent thorough suitable seasoning and other ingredients for purposes of flavor, lengthening of shelf life, and so forth, if desired. After a thorough mixing of the binder with the food products it is to adhere together, then the food products and binder are introduced into a mold, can, or other periphery-restraining area for final packaging.

It will be observed that the binder will almost immediately begin to react upon the meat or other food products so as to cause the same to cling together. Thus, the binder is suitable for the packaging of uncooked meats, for example. No heat is needed in order to render the binder effective.

Experimentation has shown that when the binder of the present invention is processed and utilized as above described, the resultant food product is extremely easy to slice, flavor is preserved, and no additives are present to detract from the eye appeal or savory character of the food product concerned.

It falls within the perview of the present invention for one simply to use a finely cut or milled skin as a binder in a given food roll or other food product. Nonetheless, for genuinely satisfactory application of the invention to a commercial establishment, it is highly preferred and almost essential that the skins be first dehydrated, then the fat removed, then the substance rendered nontoxic (to remove all fat-removal solvents from the skins) before the milling step occurs.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A method of preparing animal skin to constitute a binder in rolled food products, comprising the steps of: providing animal skin, dehydrating said animal skin to remove all the water therefrom, treating said animal skin with a fat-solvent to remove all the fat content in said animal skin, drying said skin to remove any traces of solvent present in said skin and milling the resultant animal skin.

2. The method of claim 1 wherein said dehydrating step comprises freeze-dehydrating said skin.

3. The method of claim 1 wherein said dehydrating step comprises evacuation-dehydrating said skin.

4. A method of preparing fowl skin to constitute a binder in rolled food products, comprising the steps of: providing fowl skin, dehydrating said fowl skin to remove all the water therefrom, treating the dehydrated fowl skin with a fat solvent to remove all the fat therefrom, drying the fowl skin to remove solvent traces, and milling the resultant fowl skin to a flour consistency.

References Cited
UNITED STATES PATENTS

| | | | |
|---|---|---|---|
| 1,427,438 | 8/1922 | Brickman | 99—107 |
| 2,697,112 | 12/1954 | Kramer. | |
| 2,992,247 | 7/1961 | Grettie | 260—412.6 |
| 3,173,795 | 3/1965 | Torr | 99—107 X |

HYMAN LORD, Primary Examiner

U.S. Cl. X.R.

99—209; 260—412.8